(12) United States Patent
Plummer

(10) Patent No.: US 7,145,788 B2
(45) Date of Patent: Dec. 5, 2006

(54) ELECTRICAL POWER SYSTEM FOR VEHICLES REQUIRING ELECTRICAL POWER WHILE THE VEHICLE ENGINE IS NOT IN OPERATION

(75) Inventor: Lew E. Plummer, Mount Vernon, WA (US)

(73) Assignee: PACCAR Inc, Bellevue, WA (US)

( * ) Notice: Subject to any disclaimer, the term of this patent is extended or adjusted under 35 U.S.C. 154(b) by 371 days.

(21) Appl. No.: 10/899,795

(22) Filed: Jul. 27, 2004

(65) Prior Publication Data

US 2006/0023480 A1 Feb. 2, 2006

(51) Int. Cl.
*H02M 1/00* (2006.01)
*B60R 16/04* (2006.01)
*F02N 11/06* (2006.01)

(52) U.S. Cl. ..................... 363/141; 180/68.5
(58) Field of Classification Search .............. 363/141, 363/144, 146; 180/54.1, 65.1, 68.5; 290/27, 290/28, 34, 36 R, 38 R, 40 R; 62/134, 148, 62/451

See application file for complete search history.

(56) References Cited

U.S. PATENT DOCUMENTS

| | | | |
|---|---|---|---|
| 5,039,927 A | | 8/1991 | Centafanti et al. |
| 6,018,234 A | * | 1/2000 | de Savasse .................. 322/33 |
| 6,563,288 B1 | * | 5/2003 | Ueno et al. ................. 318/783 |
| 6,605,773 B1 | * | 8/2003 | Kok et al. .................. 136/242 |
| 6,879,888 B1 | * | 4/2005 | Ochiai et al. ................. 701/22 |
| 7,082,772 B1 | * | 8/2006 | Welch .......................... 62/3.2 |

FOREIGN PATENT DOCUMENTS

| | | |
|---|---|---|
| JP | 07 143609 | 6/1995 |
| JP | 2003 197269 | 7/2003 |

* cited by examiner

*Primary Examiner*—Matthew V. Nguyen
(74) *Attorney, Agent, or Firm*—Christensen O'Connor Johnson Kindness PLLC

(57) ABSTRACT

A system for supplying electrical power for use when the vehicle engine is shut down and configurations of long-haul trucks employing the system are disclosed. The power system is a battery bank contained within an insulated enclosure. The batteries are heated when the truck is in operation with the insulated enclosure maintaining battery temperature sufficient to provide high battery power capacity for an extended period after the vehicle is shut down. A large capacitor, rather than the batteries, provides current for starting the vehicle engine. A dc-to-dc converter controls the fully charged capacitor voltage and provides capacitor charging current even when the batteries have been discharged to a low-voltage condition. The disclosed long-haul truck configurations include a storage cooler that employs a phase-change medium that is thermally charged to a low temperature while the truck is in operation and is used to provide sleeper unit cooling air. Additional provision is made for heating the sleeper unit and for powering a coolant heater that can warm the truck engine block and truck fuel when the engine is shut down during cold weather.

31 Claims, 6 Drawing Sheets

ELECTRICAL POWER SYSTEM FOR VEHICLES REQUIRING ELECTRICAL POWER WHILE THE VEHICLE ENGINE IS NOT IN OPERATION

FIELD OF THE INVENTION

The present invention relates to vehicles in which electrical power is supplied to various loads when the vehicle is not underway and to electrical power systems for supplying power to such loads.

BACKGROUND OF THE INVENTION

Various vehicles such as long-haul trucks, boats and recreational vehicles are equipped with electrical and electronic equipment that require power when the vehicle is underway and when it is parked. Such devices are often referred to as "hotel loads," and include heating and air conditioning, lighting, and appliances such as refrigerators, coffee makers and microwave ovens as well as television and entertainment systems. Although the vehicle engine can be left running at idle to provide power for hotel loads, the result is undesired fuel consumption, engine wear and the emission of pollutants. Thus, over the years, various arrangements have been proposed to supply power to vehicle hotel loads while the vehicle engine is not running.

Arrangements for powering hotel loads when the vehicle engine is not running fall into two basic categories: (1) auxiliary power units (APUs) or generator sets; and, (2) electrical power systems that are either powered by the vehicle batteries or are electrically connected to a conventional ac power outlet known as shore power. The arrangements of both categories overcome the need to idle the vehicle engine in order to power the vehicle hotel loads, thus reducing vehicle engine wear and fuel consumption. However, certain disadvantages and drawbacks remain with respect to both the currently available APUs and the currently available shore based electrical power systems.

The type of APU most commonly used is a motor-driven generator that utilizes diesel or other fuel such as gasoline or liquid petroleum. Such APUs provide an immediate source of electrical power for vehicle hotel loads and are capable of generating sufficient power for operating high demand devices such as conventionally designed heating and air conditioning units. However, APUs—especially those driven by diesel or gasoline engines—are noisy and expel pollutants into the atmosphere. Further, conventional APUs are relatively heavy, have a relatively high initial cost and present issues from the standpoint of maintenance costs and scheduling.

There are two types of electrical power systems for supplying power to vehicle hotel loads: (1) "shore power" systems in which the power system must be connected to an external source of conventional ac power (e.g., power supplied by a utility company); and, (2) systems that solely rely on the vehicle batteries. In some cases, vehicles are equipped with both types of systems.

Typically, a shore power system distributes power directly to ac powered hotel loads and includes an ac-to-dc converter for supplying current to dc powered hotel loads and for charging the vehicle batteries. Shore powered systems are superior to the use of an APU from the standpoint of initial cost, weight, maintenance considerations and noise. However, a conventional power outlet may not be available where the vehicle operator either needs to or is required to stop.

Systems that use the vehicle batteries to supply hotel loads primarily consist of wiring to interconnect dc powered hotel loads to the vehicle batteries and an inverter unit for transforming dc current drawn from the batteries to ac current for the ac powered hotel loads. Such systems also are superior to the use of an APU from the standpoint of initial cost, weight, maintenance considerations and noise. However, systems powered solely by the vehicle batteries often are not capable of supplying the needed amount of current for the vehicle hotel loads for a sufficient or desired period of time without discharging the vehicle batteries to a point at which the vehicle cannot be started. Thus, these systems often include monitoring circuits and alarms to guard against overly discharging the batteries.

Design constraints applicable to power systems for hotel loads are in part dictated by the vehicle in which the systems are employed. One very demanding situation is the design and implementation of such power systems for large long-haul trucks equipped with sleepers (e.g., Class 8 vehicles, which consist of trucks having a gross vehicle weight exceeding 33,000 pounds). Powering the hotel loads with the engine idling, or periodically starting the truck to charge the vehicle batteries during stops of any duration often is not a viable option. Specifically, a growing number of state and regional authorities are enacting "no-idle" rules and regulations that limit how often the engine may be idled during a stop and the duration over which the engine may be idled. On the other hand, Federal legislation mandates ten continuous hours rest during a 24-hour period for commercial truck drivers. No-idle regulations also complicate existing harsh design and operational constraints that apply to hotel load power systems for long-haul trucks. For example, a system for providing hotel power in long-haul trucks should be capable of operating reliably over a wide range of ambient temperatures (outside air temperature), such as 110° F. (approximately 42° C.) or more, to −20° F. (approximately −12° C.) or less. Reliable operation at sub-zero ambient temperatures can be difficult to achieve because the power capacity of the vehicle batteries is greatly reduced at low ambient temperatures. By way of example, the capacity of a typical lead-acid truck battery is reduced by approximately 50% relative to supplying a 5-amp load current when the ambient temperature reaches freezing. Thus, the time period during which hotel loads can be powered is dramatically reduced.

Regardless of ambient temperature, long-haul trucks require hotel load power for required driver rest periods of 10 hours or more while retaining adequate power to start a large diesel engine of the type that normally powers such a vehicle. In addition, it is desirable that the power system be capable of supplying hotel loads for a period of time that substantially exceeds a rest period of 10 hours. Specifically, reserve power capability is desired so that hotel load current can be supplied should the truck be unable to resume a trip because of extremely harsh weather conditions or other causes.

Although weight and maintenance considerations can be important with respect to other vehicles, they are of special significance with respect to power systems for long-haul trucks. Reduced weight means reduced fuel costs and less pollution and, in cases such as bulk transport vehicles, can mean increased load capacity. Low maintenance can mean shorter return on investment and, further, can result in additional saving if maintenance of the power system can be performed on the same schedule as other truck maintenance.

Although progress has been made, the prior art has not fulfilled the need a battery-powered low maintenance, low cost, light weight, efficient power system that provides reliable operation over a wide temperature range while simultaneously ensuring that electrical power is available for engine starting at low ambient temperatures and after extended periods of operation

SUMMARY OF THE INVENTION

One important aspect of the invention is maintaining the batteries that power the vehicle hotel loads in a controlled thermal environment to ensure battery operation at or near maximum power capacity regardless of ambient temperature. In accordance with this aspect of the invention, the batteries are contained in a thermally insulated enclosure and are heated to a predetermined temperature by electrical heating elements when the vehicle engine is in operation. During periods in which the vehicle engine is not running and battery power is being made available for hotel loads, the insulated enclosure maintains the temperature of the batteries high enough to prevent a significant decrease in battery power capacity even when the ambient temperature is well below freezing. In the disclosed exemplary embodiments of the invention, the battery heaters are connected to the vehicle power system by means of a relay that is energized and de-energized to control battery temperature. A voltage regulator includes an arrangement for determining battery temperature based upon a signal supplied by a temperature sensor that is mounted to one of the battery posts and energizes and de-energizes the relay so that the batteries are maintained at or near the desired predetermined temperature (e.g., 85° F.; approximately 29° C. in the currently preferred embodiments of the invention).

The preferred embodiments of the invention do not use the vehicle batteries to start the vehicle engine, using instead a large capacitor that is often referred to as an "ultra-capacitor." In the currently preferred embodiments of the invention, the fully charged terminal voltage of the ultra-capacitor is established by an up/down dc-to-dc converter that is electrically connected between the vehicle batteries and the ultra-capacitor. In these embodiments, the fully charged terminal voltage of ultra-capacitor is a predetermined voltage (a design value) that is less than the maximum output voltage of the vehicle alternator and is greater than a voltage that indicates the batteries are in a discharged state. When the alternator voltage is above the predetermined fully charged ultra-capacitor voltage, the dc-to-dc converter down converts the alternator voltage to the predetermined fully charged ultra-capacitor voltage. On the other hand, when the system is supplying current to hotel loads and the battery voltage falls below the voltage that indicates a discharged state, the dc-to-dc converter up converts the battery voltage to maintain the capacitor charging voltage equal to the predetermined value. Further, in the most preferred embodiments, the dc-to-dc converter includes circuitry for monitoring the dc current being supplied to the ultra-capacitor. When the charging current falls to a level that indicates that the ultra-capacitor is fully charged, the dc-to-dc converter is de-energized and remains off until the capacitor voltage falls below the predetermined ultra-capacitor charging voltage (which may be caused by capacitor self discharge or engine start). Also included in the dc-to-dc converter is circuitry for energizing a light-emitting diode (LED) to indicate the capacitor is fully charged and available for starting the truck. De-energizing the dc-to-dc converter eliminates dc-to-dc converter quiescent current during periods of time in which the ultra-capacitor is fully charged, thereby conserving energy for use in powering the hotel loads.

Another aspect of the invention relates to packaging of the electrical power system for ease of deployment in a long-haul truck or other vehicle. In particular, the electrical power system can be arranged in a variety of modular configurations that are suitable for installation at the time of vehicle manufacture or as an after market addition to an existing vehicle. In one disclosed arrangement, the batteries and all other components of the electrical power system are mounted within an insulated enclosure even though the operation of the ultra-capacitor and other system components are not adversely affected by ambient temperature. One advantage of such an arrangement is that the thermal mass of the ultra-capacitor and other components provides an additional source of thermal energy to maintain the interior of the insulated enclosure and, hence, the batteries, within a desired temperature range when the vehicle engine is not running and power is being made available for the hotel loads. In another disclosed embodiment, the ultra-capacitor is mounted in an enclosure that is somewhat similar to a conventional battery box that is located near the engine starter motor. In that particular embodiment, only the system batteries and battery heater are contained in an insulated enclosure with the insulated enclosure and the remaining electrical power system components being configured as a module that can easily be installed in a long-haul truck or other vehicle.

Yet another aspect of the invention relates to integrating the electrical power system of the invention with hotel loads and other equipment that may require power when the vehicle engine is shut down to achieve an overall system that is highly efficient with respect to the consumption of electrical energy. For example, in the currently preferred embodiments of the invention, the electrical power system operates in conjunction with a passive cooling system (sometimes referred to as a "storage cooler") to provide cooling air for the interior of the vehicle. As is known in the art, storage coolers in effect are thermally charged to a low temperature during a first operational phase and are thermally discharged to provide a cooling source during a second operational phase. As used in the practice of the invention, the storage cooler is thermally charged while the vehicle is under power and is discharged when the storage cooler is operated to provide cooling air during periods in which the vehicle engine is off. By way of further example, lighting is preferably provided by low voltage lighting units that employ light-emitting diodes (LEDs) and hotel loads such as refrigeration units, microwave ovens and other devices are selected at least in part to reduce ac and dc current draw from the electrical power system. Additionally, the currently preferred embodiments of the invention employ a fuel-fired air heater to maintain interior regions of the vehicle at a comfortable temperature. As is known in the art, such devices are fuel efficient, with electrical power requirements being limited to current sufficient to operate a small blower motor and fuel pump.

Although the invention can be practiced in a variety of vehicle environments, maximum performance is achieved in vehicle cabins that are insulated and otherwise constructed to thermally isolate interior regions of the vehicle from the environment. For example, the invention currently is being embodied in prototype form for use in a long-haul truck that is equipped with a sleeper cab. In that prototype arrangement, a laminated material formed by layers of insulating foam and metallic foil is used to insulate the walls of the sleeper unit and to form window covers and a curtain that is used to separate the sleeper unit from the forward portion of the truck cab.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
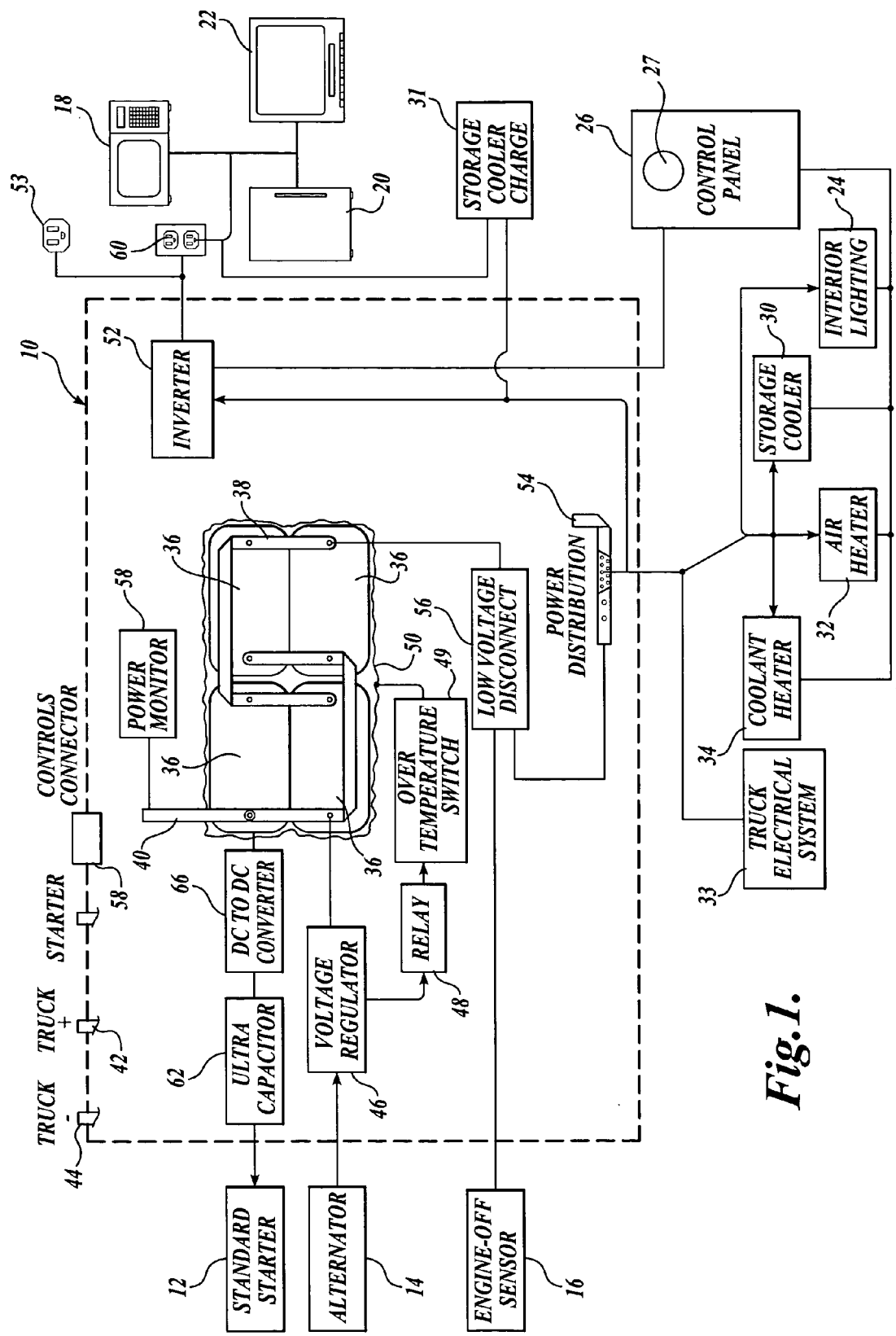
FIG. 1 diagrammatically depicts an exemplary embodiment of the invention, which includes an electrical power system in combination with various hotel loads and heating and cooling units of a long-haul truck or other vehicle.

FIG. 1 is a diagram that illustrates an embodiment of the invention configured for installation in a vehicle such as a diesel powered long-haul truck that is equipped with a sleeper cab. Components of the electrical power system of the invention are shown within dashed outline 10. As shall be described relative to FIG. 2, in one physical realization of the invention, all components of the power system shown within dashed outline 10 are contained within an insulated enclosure that thermally isolates the batteries of the power system from the thermal environment in which the enclosure is mounted. In another physical realization of the invention (shown in FIG. 3), only the system batteries are contained in an insulated enclosure.

Located outside dashed outline 10 of FIG. 1 are the truck starter motor 12, the truck alternator 14, and an engine-off sensor 16. Also shown outside dashed outline 10 are electrically powered hotel loads of the type involved with practicing the invention. Examples of such hotel loads shown in FIG. 1 include a microwave oven 18, a refrigerator 20, and a television/entertainment system 22. Also indicated in FIG. 1 is a control panel 26 that includes controls and a power monitor 27 that provides status information relating to the power system and other components shown in FIG. 1. For example, power monitor 27 provides information such as battery voltage and the amount of time the power system will continue to supply power at the current battery drain rate. Additional components that are located outside dashed outline 10 in the arrangement of FIG. 1 include interior lighting 24 for the vehicle, a storage cooler 30 and an air heater 32 that provide heating, ventilation and cooling for the interior of the sleeper cab during periods of time in which the vehicle engine is not running. Also shown is a coolant heater 34 that is optionally employed on trucks that operate in cold weather climates. Coolant heater 34 is either manually turned on or automatically energized when the vehicle is parked at a location during cold weather. When energized, coolant heater 34 supplies hot water to the engine block and fuel warmers that are located in the vehicle fuel tanks. Coolant heaters of the type indicated in FIG. 1 are known in the art and are used with conventional fuel warmers that prevent the diesel fuel from starting to gel or wax at low ambient temperatures and additionally are used in conventional arrangements that maintain the engine block at a temperature at which the engine can be started with relative ease.

Turning now to the components shown within dashed outline 10, a bank of four batteries 36 are employed to power the vehicle hotel loads (e.g., microwave 18, refrigerator 20, television/entertainment unit 22, and interior lighting 24) as well as other vehicle components such as storage cooler 30, air heater 32, and coolant heater 34, that may require electrical energy when the vehicle is parked. Although four batteries 36 are shown in FIG. 1, fewer or more batteries may be employed, depending upon system requirements. For example, during the development of the invention, three batteries were used in one experimental arrangement.

Regardless of the number employed, the batteries 36 are connected in parallel, as indicated in FIG. 1, by a conductive bus or strap 38 that interconnects the positive battery terminals and a conductive bus or strap 40 that interconnects the negative battery terminals. Although not specifically shown in FIG. 1, conductive bus 38 extends to a terminal or other electrical connector that allows connection of the positive battery terminals with the vehicle lights and other dc-powered vehicle components that require power when the truck engine is in operation. By way of example, conductive bus 38 that interconnects the positive battery terminals may extend to a conductive post or strap 42 that projects through dashed outline 10, and, hence, to the exterior of an insulated enclosure that encloses the batteries. Likewise, conductive bus 40 that interconnects the negative battery terminals may extend to a post or strap 44 that extends through dashed outline 10, and, hence, to the exterior of the insulated enclosure that contains batteries 36. In the arrangement of FIG. 1, a power monitor circuit 58 is shunt-connected to negative conductor bus 40. Power monitor 58 senses the battery voltage and current draw and provides battery status signals to control panel 26, including a signal indicative of the amount of time the electrical power system will continue to supply power at the then current battery drain rate. Suitable power monitors are known in the art and include a product known as the Link 10 system, which is manufactured by Xantrex Technology, Inc., of Vancouver, British Columbia, Canada.

Various commercially-available batteries, including lead, acid-type 31 batteries capable of deep-cycling for supplying power to hotel loads can be used in the practice of the invention. In the most preferred embodiments of the invention, sealed batteries are used in which an absorbent glass fiber-mat, that is impregnated with electrolyte or an electrolyte gel, is interposed between the battery plates. One such battery that has been employed in a prototype arrangement of the invention is manufactured by Johnson Controls, Inc., of Milwaukee, Wis. under the product name Optima Batteries®. Optima Batteries used in the prototype each have an 85 ampere hour rating and a 160 minute reserve capacity (at a 25 amp load). Regardless of the type of batteries employed, conventional venting arrangements (not shown in FIG. 1) should be used so that any hydrogen gas produced by the batteries does not accumulate within the insulated enclosure that contains the batteries.

Batteries 36 are charged by the truck alternator 14 while the truck is running. In the arrangement shown in FIG. 1, the field winding of alternator 14 is electrically connected to a microprocessor-based programmable voltage regulator 46 which, in turn, is connected to the conductive bus 40 that interconnects the negative terminals of batteries 26. In FIG. 1, an outline 50 that surrounds batteries 36 symbolizes a battery heater that is used to heat the batteries during periods of time in which the truck is in operation. In the depicted arrangement, electrical current is supplied to the battery heater (outline 50) by voltage regulator 46 via a series connected heater relay 48 and over temperature switch 49.

In a prototype embodiment of the invention, the heater represented by outline 50 is a carbon and fiberglass reinforced plastic sheet material. Both surfaces of the carbon sheet material are coated with a thin, flexible layer of insulation with terminals being provided to provide electrical connection to the carbon sheet material. In the prototype embodiment, the carbon sheet material provided on output of 200 watts per meter squared. When wrapped about batteries 36, the material provides heating sufficient to maintain the batteries at a temperature that ensures reliable operation.

Figure 2:
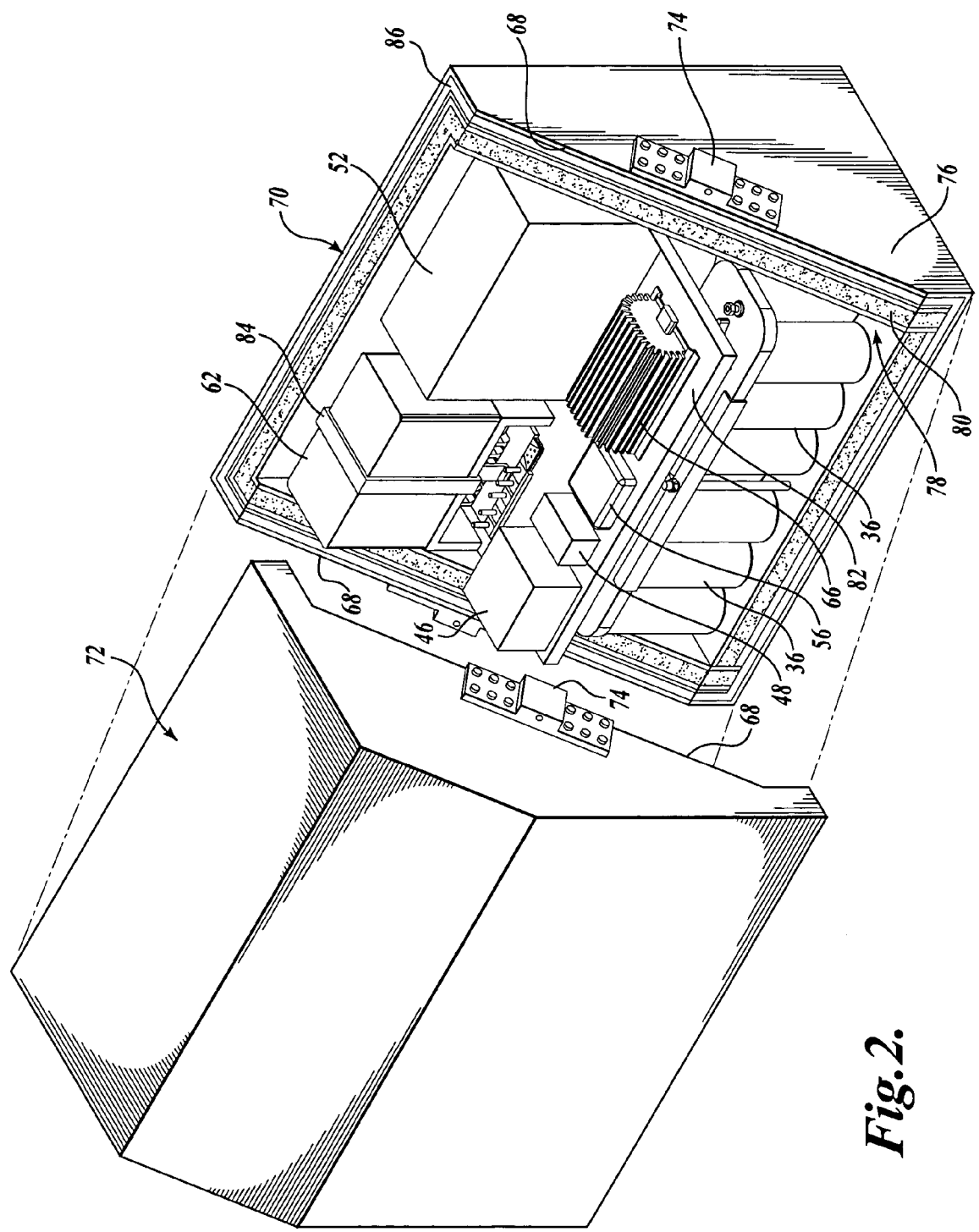
FIG. 2 illustrates one arrangement for embodying the invention as a module that can easily be installed in and carried by a long-haul truck or other vehicle.

In embodiments of the invention, such as shall be described relative to FIG. 2, the entire interior of the insulated enclosure containing batteries 36 and other components of the electrical power system is heated with both batteries 36 and the other components shown within dashed outline 10 of FIG. 1, being wrapped with heater material. In other embodiments, such as shall be described relative to FIGS. 3 and 4, only the batteries 36 are heated.

To control the temperature of the battery heater represented by outline 50, voltage regulator 46 is programmed and arranged for sensing battery temperature and for energizing and de-energizing the battery heater relay 48 to maintain the battery temperature within a pre-determined range while the truck is in operation (i.e., at or near a desired predetermined temperature). In the previously-mentioned prototype arrangement of the invention, voltage regulator 46 energizes and de-energizes heater relay 48 to maintain the battery temperature at 29° C.±3° (approximately 85° F.). Over temperature switch 49 is mounted on, or in close proximity to, the battery heater. Current flows through over temperature switch 49 under control of heater relay 48 as long as the temperature of switch 49 remains below a predetermined temperature limit (approximately 140° F., i.e., 60° C., in the currently preferred embodiments). Current flow through over temperature switch 49 is interrupted during any interval of time during which the switch temperature remains above the predetermined temperature limit. Various electromechanical and electronic devices that satisfactorily function as heater relay 48 and over temperature switch 49 are known in the art.

To provide an indication of the temperature of batteries 36, a thermistor or other temperature sensor (not shown in FIG. 1) is mounted to one or more terminals of batteries 36 and is electrically connected to voltage regulator 46. Based upon the signal supplied by the thermistor (or other temperature sensor), voltage regulator 46 determines battery temperature as indicated at one or more battery posts and activates heater relay 48 so that the battery heater (indicated by outline 50 in FIG. 1) is energized when alternator 14 produces an output voltage and battery temperature is below the desired predetermined temperature. When the battery terminal temperature reaches the desired predetermined temperature, voltage regulator 46 de-energizes heater relay 48. Regulators that include arrangements for sensing battery temperature are commercially available from Balmar, Inc., of Arlington, Wash. and other sources. Those skilled in the art will recognize that circuitry for controlling heater relay 48 need not be incorporated in voltage regulator 46 and, further, that various temperature sensing switching arrangements other than voltage regulator 46 can be used to activate the battery heater.

Also located within dashed outline 10 is a power inverter 52, a power distribution center 54, and a low voltage disconnect 56, which are interconnected for providing ac and dc power to the vehicle hotel loads and other vehicle components (e.g., storage cooler 30 and coolant heater 34) that may be in operation when the vehicle is parked. As is known in the art, low voltage disconnects are often used to disconnect vehicle batteries from auxiliary loads such as hotel loads when battery terminal voltage reaches a predetermined disconnect voltage to thereby eliminate battery drain. In the arrangement of FIG. 1, low voltage disconnect 56 is electrically connected to the positive terminals of batteries 36 via conductive bus 38 and is electrically connected to engine-off sensor 16. In this arrangement, engine-off sensor 16 provides a voltage that is at or near ground potential (0 volts) when the engine is running to complete an electrical path that includes low voltage disconnect 56 and prevents low voltage disconnect 56 from shutting down (disconnecting) batteries 36 while the vehicle is in operation.

It will be recognized by those skilled in the art that low voltage disconnect units are typically connected to vehicle ignition power to obtain a signal indicating that the vehicle engine is running. Such an arrangement is suitable for practicing the invention, However, other sensor arrangements can be employed. For example, one prototype embodiment of the invention utilized a conventional oil pressure switch that grounds low voltage disconnect 56 when the truck engine is running. Use of an oil pressure sensor or other arrangement that is not dependent upon the vehicle ignition system eliminates the possibility of the low-voltage disconnect failing to disconnect the hotel loads should the ignition key be inadvertently left in an on position.

As is known to those skilled in the art, the disconnect voltage of low voltage disconnects typically is set by the manufacturer to a voltage that is specified by purchasers. As also is known to those skilled in the art, currently available low voltage disconnects provide electrical and/or audible warning signals prior to disconnecting the batteries. In the currently preferred embodiments of the invention, the disconnect voltage is on the order of 11 volts, which is somewhat lower than the disconnect voltage employed in more conventional arrangements (conventional systems must provide enough reserve capacity to start the vehicle engine). Further, low voltage disconnect 56 preferably disconnects batteries 36 from power distribution center 54 after a predetermined time delay that exceeds the delay used in more conventional low voltage disconnect arrangements. Specifically, in some embodiments of the invention, vehicle equipment such as diesel fired heaters may require a shut down delay and equipment such as a microwave oven may draw a high current (e.g., approximately 120 amps dc) that temporarily reduces the battery bus voltage. To provide for equipment shut-down and high current situations, low voltage disconnect 56 of the currently preferred embodiment of the invention disconnects batteries 36 from power distribution center 54 if the battery voltage remains below 11 volts for a period of 10 minutes (with heater shut down beginning after 7 minutes has elapsed). However, should the battery voltage reach 10 volts (or less) at any point in time, low voltage disconnect 56 disconnects the batteries after a 30 second delay.

Power distribution center 54 of FIG. 1 basically is a fuse block and associated wiring that supplies dc power to inverter 52, hotel loads such as interior lighting 24, and other vehicle devices that require dc power when the vehicle engine is not running (e.g., storage cooler 30, air heater 32, and coolant heater 34 of FIG. 1). One arrangement that can be used as power distribution center 54 is disclosed in a patent application that is being filed concurrently with this application, entitled "Electrical Power Unit and Power Distribution Center Therefor," which names as inventor Lew Plummer and which is assigned to the assignee of this invention. The disclosure of the referenced application being hereby incorporated by reference.

In the arrangement disclosed in the referenced patent application, all or a portion of the power distribution center is mounted on or forms a part of a conductive bus that interconnects like polarity terminals of the batteries of a battery bank (e.g., conductive bus 38 that interconnects the positive terminals of batteries 36 in FIG. 1). Although more conventional arrangements can be used for power distribution center 54, utilizing the arrangement of the referenced patent application (or modifications thereof, such as those described herein) can be advantageous from the standpoint of compactness, electrical efficiency, and the amount of wiring required in the vehicle.

FIG. 1 schematically depicts a power distribution center 54 as being connected to an input terminal of interior lighting 24, storage cooler 30, air heater 32, the vehicle electrical system 33, and coolant heater 34. In addition, as is indicated in FIG. 1, a second input terminal of each noted component, other than the vehicle electrical system is connected to control panel 26. Although not shown in FIG. 1, control panel 26 includes switches and other conventional circuitry of activating and controlling the noted vehicle and electrical control system components. Those skilled in the art will recognize that separate conductors are typically connected to supply power to various loads such as the hotel loads and other vehicle loads shown in FIG. 1 and described above. Thus, in realizing the invention, the conductors that supply power to hotel loads and other vehicle devices that require power when the engine is not running may extend from power distribution center 54 to a multi-pin connector (58, in FIG. 1) that is shown as extending outwardly through dashed outline 10 in FIG. 1. A cable or wire harness that includes suitable connectors (not shown in FIG. 1) interconnects connector 58 and, hence, power distribution center 54, with control panel 26 and any system components for which dc power is not supplied via control panel 26.

As previously noted, inverter 52 of FIG. 1 is connected for receiving dc power from power distribution center 54 and for supplying ac power to the vehicle hotel loads, such as microwave oven 18, refrigerator 20, and television/entertainment system 22 in FIG. 1. As is indicated by ac receptacle 60 in FIG. 1, provision may be made for supplying ac power to the hotel loads by means of conventional power cords. Alternatively, or in addition, the ac power may be wired directly to one or more of the hotel loads. AC power may also be supplied to the ac loads when the vehicle is connected to shore power via a shore power connector 53 of FIG. 1. Although not specifically shown in FIG. 1, inverter 52 preferably is an inverter/converter means for charging batteries 36 whenever a shore power connection is available.

Various commercially available power inverters are suitable for use as inverter 52 of FIG. 1, the primary selection consideration being output capacity, efficiency, and, in some situations, physical configuration and size. One example of a power inverter for use in the invention as embodied in a long haul truck is a 2000 watt inverter that is manufactured by Xantrex Technology, Inc., of Vancouver, British Columbia.

As previously noted, the arrangement of FIG. 1 includes a storage cooler 30 and an air heater 32 that are used to provide cooling and heating for the interior of the vehicle during periods of time in which the vehicle engine is not running. In the currently preferred embodiments of the invention, which are configured and arranged for use in long-haul trucks, storage cooler 30 is an energy-efficient auxiliary air conditioning unit in which water, brine solution, or other phase change material stores thermal energy while the truck is in operation. When the truck engine is shut down and the storage cooler is supplying cool air to the truck cab, a small blower motor (not shown in the FIGURES) provides air that is cooled by the thermal storage mass. Although various passive or thermal storage cooling systems are known, the currently preferred embodiments of the invention use the type of system disclosed in a patent application that is being filed concurrently with this application entitled "Method and Apparatus for Cooling Interior Spaces of Vehicles," which names as inventor Lew Plummer and which is assigned to the assignee of this invention. The disclosure of which is hereby incorporated by reference. In that arrangement, a storage cooler charge unit (31 in FIG. 1) is powered by the vehicle electrical system while the vehicle is in operation and is powered by batteries 36 and inverter 52 when the vehicle is parked and not connected to shore power. Located within storage charge unit is motor-driven compressor and a closed circuit cooling system that reduces the temperature of a refrigerant that is routed through storage cooler 30. The low temperature refrigerant passes through an evaporator unit within storage cooler 30 to transfer heat from the phase change material of the thermal storage mass. The refrigerant, warmed by the transfer of thermal energy to cool the thermal storage mass, is returned to storage cooler charge unit 31 and the cooling cycle is repeated to maintain the thermal storage mass at a temperature that provides cooling air.

To provide an energy-efficient air heater 32, the currently preferred embodiments of the invention use a diesel fired heater, which is fuel efficient and requires only a small amount of electrical energy to power a small blower motor and fuel pump. Such devices are well known in the art. For example, an Air Top 2000 air heater, manufactured by Webasto Product North America Inc. of Fenton, Mich., is suitable for use in practicing the invention.

In embodiments of the invention that are employed in trucks that are optionally equipped with a coolant heater 34, the coolant heater also is preferably selected to minimize electrical load requirements during no idle operation. In that regard, diesel-powered coolant heaters such as the TSL-17 Coolant Heater (equipped with a high flow water pump), manufactured by Webasto Product North America Inc. of Fenton, Mich., may be employed.

As previously mentioned, the invention preferably uses a large capacitor (an "ultra-capacitor") rather than batteries 36 to start the vehicle. In the arrangement depicted in FIG. 1, ultra-capacitor 62 is electrically connected to supply current to the vehicle's starter motor 12 during the vehicle start sequence. In the currently preferred embodiments of the invention, ultra-capacitor 62 is a 120 kilojoule unit provided by Kold Ban International of Lake in the Hills, Ill. Although ultra-capacitors that store less than 120 kilojoules of energy may be used, the 120 kilojoules unit is advantageous in that it is capable of powering the vehicle starter motor through ten or more starting cycles without being recharged.

In the arrangement of FIG. 1, ultra-capacitor 62 also is connected to and is recharged by an up/down dc-to-dc converter 66, which is powered by batteries 38. In the currently preferred embodiments of the invention, dc-to-dc converter 66 operates to maintain ultra-capacitor 62 at a predetermined target voltage that is less than the maximum voltage provided by alternator 14 and is greater than the voltage required to drive starter motor 12. For example, in the previously-mentioned prototype arrangements, dc-to-dc converter 66 operates to maintain the terminal voltage of ultra-capacitor 62 at 13.92 volts (which is 0.8 volts greater than the voltage of a standard battery-powered starting system). To maintain ultra-capacitor 62 at the desired target voltage, dc-to-dc converter 66 down converts to supply a 13.92 volt charging potential for ultra-capacitor 62 when the vehicle is in operation and alternator 14 supplies a voltage greater than 13.92 volts (e.g., 14.2 volts, which is the typical output voltage of conventional alternators when the vehicle is operating at normal speeds). On the other hand, on occasions in which the vehicle engine is shut down and batteries 36 are supplying power (for example 12.8 to 10.2 vdc) to the point at which the available battery voltage is less than the ultra-capacitor target voltage, dc-to-dc converter 66 functions as an up-converter. The result is that current will be available to charge ultra-capacitor 62 to the predetermined target voltage under even the worst case operating conditions. For example, although unlikely, a situation could arise under which batteries 36 have been discharged to the point at which low voltage disconnect 56 disconnects the vehicle hotel loads and other devices that require current while the vehicle engine is shut down. Under such a condition, ultra-capacitor 62 would normally be fully charged and would supply sufficient current to start the vehicle and the batteries would be recharged. However, in the event that repeated attempts to start the vehicle with ultra-capacitor 62 were unsuccessful, dc-to-dc converter 66 converts the low battery voltage to the predetermined target voltage of ultra-capacitor 62, thereby recharging ultra-capacitor 62 and allowing additional attempts to start the vehicle. Thus, it can be noted that the capacitor charging function is not interrupted by the operation of low voltage disconnect 56. However, since batteries 36 support the normal truck starting circuits, it may be necessary to reset low voltage disconnect 56 to start the vehicle after a low voltage disconnect has occurred.

Up/down dc-to-dc converters of the type described above are known in the art and can be supplied by various manufacturers such as Sure Power Industries, Inc., of Tualatin, Oreg., with the predetermined target voltage for ultra-capacitor 62 being established during the manufacture of the dc-to-dc converter, or when the converter is assembled with other components of the invention. In addition, although not necessary for the practice of the invention, dc-to-dc converter 66 can incorporate modifications that are helpful in the practice of the invention. For example, sensing circuitry can be added to detect the terminal voltage of ultra-capacitor 62 and, in addition, to detect the current that is being supplied to ultra-capacitor 62. Inclusion of such circuitry, which in the alternative could be external to dc-to-dc converter 66, can be used to provide additional features such as illuminating an LED indicator when ultra-capacitor 62 is fully charged. Another helpful feature that can be added by detecting the ultra-capacitor terminal voltage and the current being supplied by dc-to-dc converter 66 is turning off the dc-to-dc converter when the current being supplied to ultra-capacitor 62 reaches a low value (such as the quiescent current of the dc-to-dc converter), to thereby conserve battery power when the ultra capacitor is fully charged. In the event such a feature is employed, dc-to-dc converter 66 is re-energized when the terminal voltage of ultra-capacitor 62 falls below the predetermined target value. For example, in embodiments of the invention in which the ultra-capacitor target voltage is 13.92 volts, the design value for re-energizing dc-to-dc converter 66 is 13.82 volts (i.e., a 100 millivolt decrease in ultra-capacitor terminal voltage).

FIG. 2 illustrates the invention configured for installation in place of a long-haul truck battery bank of the type that is mounted under the cabin on the frame rail in the general vicinity of the driver area. In the arrangement of FIG. 2, all components of the invention that are shown within dashed outline 10 of FIG. 1 are contained within an insulated enclosure which includes a lower enclosure unit 70 and an upper enclosure unit 72. When the insulated enclosure is installed in the vehicle, lower and upper enclosure units 70 and 72 are secured to one another by latch plates 74 that are located along the boundaries 68 of lower and upper enclosure units 70 and 72.

As shown in FIG. 2, lower enclosure unit 70 includes an inner metal shell 78 having a horizontal bottom plate, a vertically extending back plate and spaced-apart side plates that are located at the edges of the bottom plate and extend diagonally between the bottom plate and the upper boundary of the inner shell back plate. Spaced apart from and parallel to the surfaces of inner shell 78 is an outer shell 76 which also includes a horizontal bottom plate, a vertically extending back plate and spaced apart side plates. Sandwiched between the inner and outer shells 78 and 76 is a layer of thermal insulation 80. Preferably, insulation 80 is an expanded foam material, with expanded polypropylene being currently preferred. With respect to providing sufficient thermal insulation, it will be recognized that the effectiveness of most insulating material (including expanded polypropylene or other expanded foam material) is a function of material density and thickness, with resistance to heat flow being specified by an "R" value. In a prototype design of the arrangement shown in FIG. 2, expanded polypropylene having an R value of 8.2 was employed with the thickness of the insulation (the distance between parallel inner and outer shells 78 and 76) being dimensioned to achieve an R value of approximately 6.7. Although the invention can be practiced with various R insulation values, it currently is believed that a R value of at least 4.0 should be used.

In the arrangement of FIG. 2, four batteries 36 are secured to the bottom plate of inner shell 78, with the batteries being positioned and connected in parallel with one another in the manner shown in FIG. 1. A horizontal shelf 82 is located immediately above batteries 36. Inverter 52 and ultra-capacitor 62 are secured to shelf 82, along the vertically extending rear wall of inner shelf 78. In the depicted arrangement, a substantially U-shaped hold-down strap 84 encompasses ultra-capacitor 62. Bolts or other conventional fasteners that extend through outwardly extended flanges that are positioned at the lower terminus of hold-down strap 84 secure ultra-capacitor 62 to shelf 82. Typically, inverter 52 is secured to shelf 82 by bolts or other conventional fasteners that pass through mounting holes included in the inverter. Also secured to shelf 82 are voltage regulator 46, relay 48, low voltage disconnect 56, and dc-to-dc converter 66. Preferably, shelf 82 and the above noted system are assembled as a pre-assembled module that can be installed on mounting rails that are mounted the spaced apart sidewalls of inner metal shell 78. It will be noted that wiring for interconnecting the components of shelf 82 with control panel 26 (in FIG. 1) hotel loads such as interior lighting 24, storage cooler 30, air heater 32 and coolant heater 34 (also shown in FIG. 1) and batteries 36 (e.g., conductive buses and connectors 42, 44, and 58 in FIG. 1) are not shown in FIG. 2. These interconnections can be made using conventional wire harness techniques in combination with connectors that pass outwardly through the rear panels of inner and outer shell 78 and 76 of lower enclosure unit 70. In the most preferred embodiments, the wiring that interconnects the components of shelf 82 extends to connectors that pass downwardly through shelf 82. The connectors (not shown in FIG. 2) engage with mating connectors that are mounted to lower enclosure unit 70. The connectors mounted to shelf 82 are aligned with the connectors mounted to lower enclosure unit 70, so that interconnection occurs when shelf 82 is lowered into place and installed in lower unit 70.

Upper enclosure 72 of FIG. 2 is constructed and arranged in a manner similar to lower enclosure unit 70. That is, upper enclosure unit 72 includes spaced apart inner and outer shells with the thermal insulation material filling the space between the inner and outer shells. When upper enclosure 72 is assembled to lower enclosure 70, bolts or other fastening means are used to draw the latch plates 74 to one another to thereby tightly secure upper enclosure unit 72 to lower enclosure unit 70. Preferably, a double (inner/outer) seal strip 86 extends around the periphery of both outer and inner shell 76 and 78 of lower enclosure unit 70 to provide an air tight seal of low thermal conductivity when lower and upper enclosure units 70 and 72 are joined together.

Figure 3:
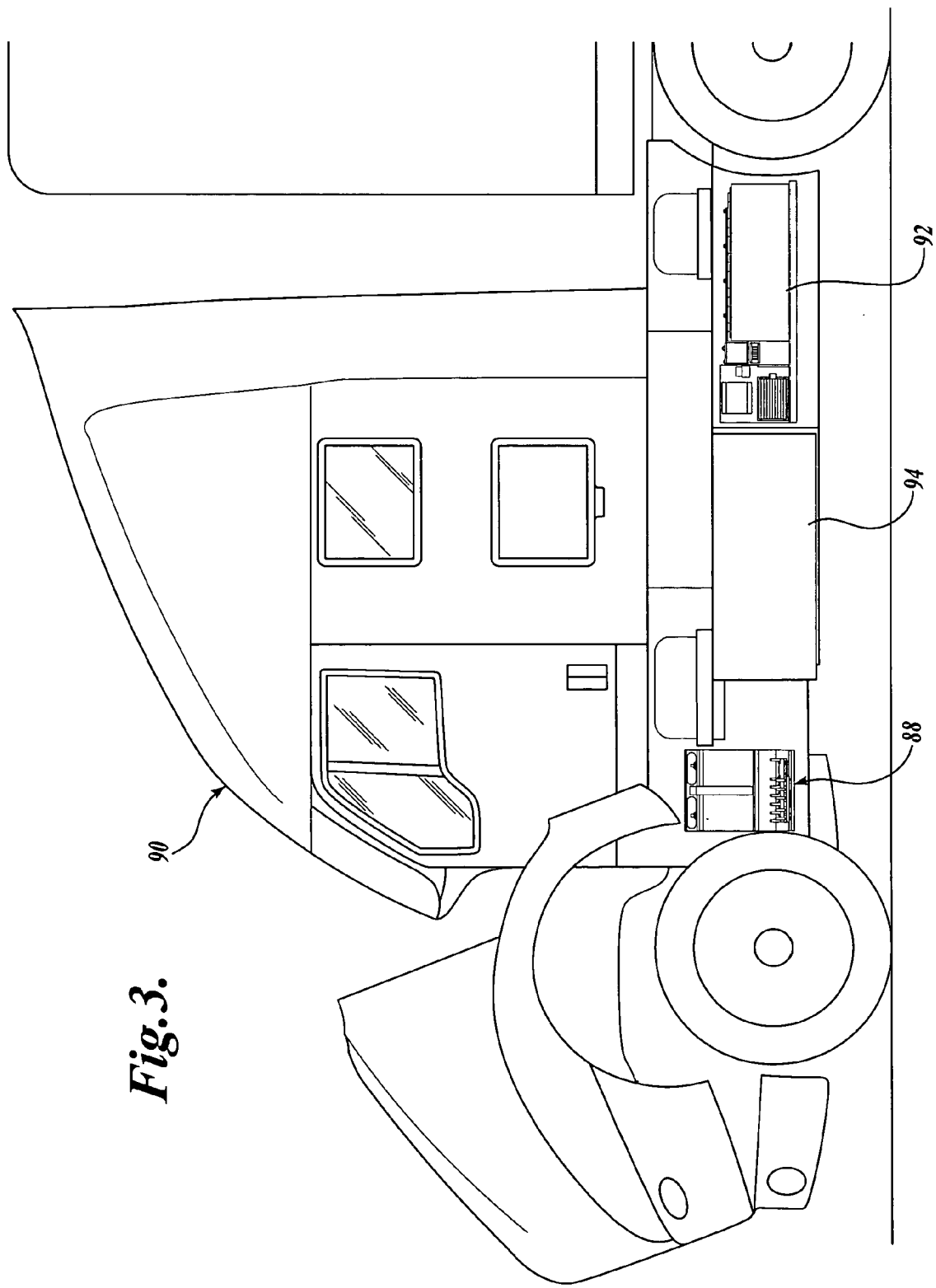
FIG. 3 depicts a side view of the forward portion of a long-haul truck, illustrating a second arrangement for embodying the invention in a modular form that can easily be installed in and carried by a long-haul truck.
Figure 4:
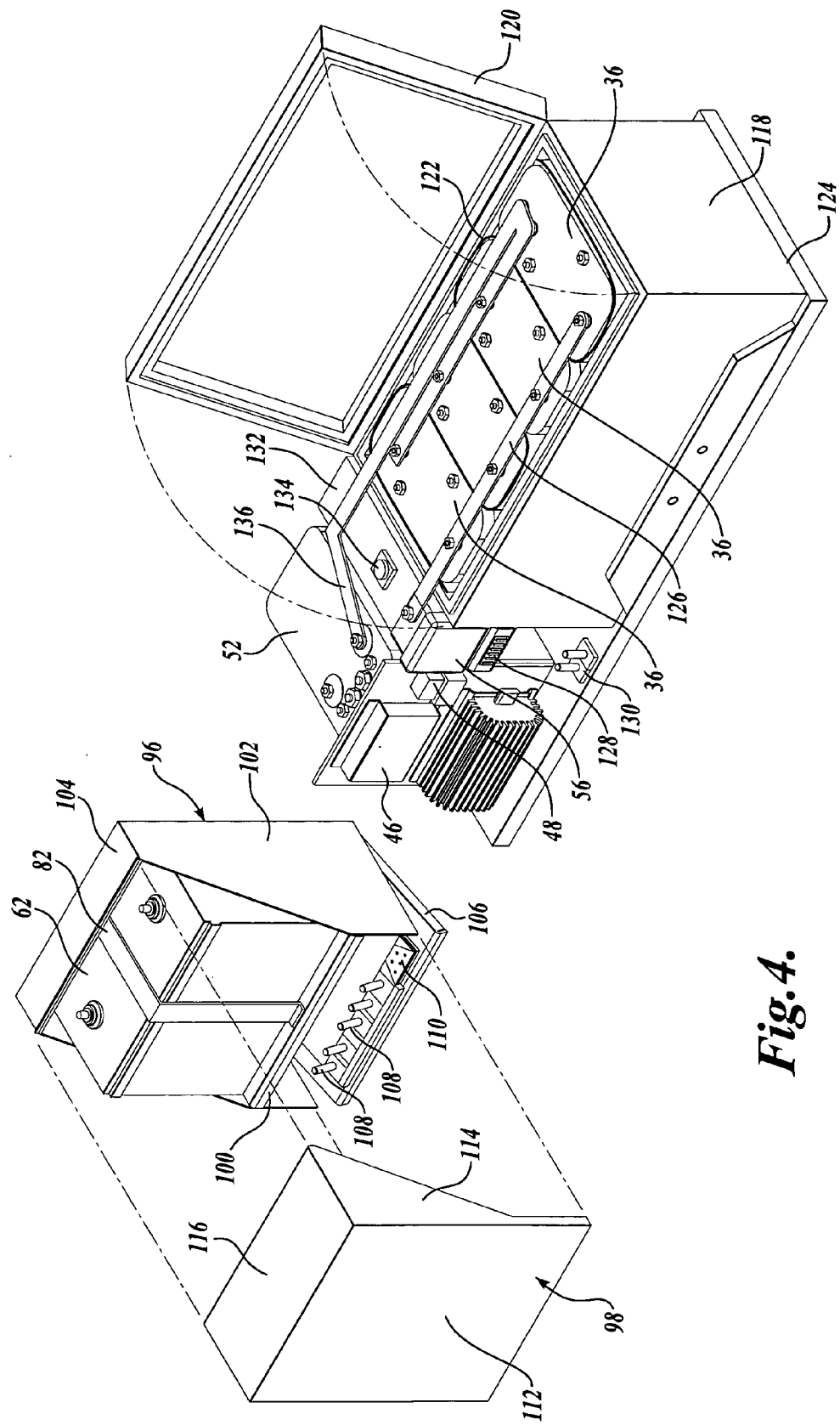
FIG. 4 illustrates, in more detail, the modular arrangement of the invention that is depicted in FIG. 3.

FIGS. 3 and 4 illustrate a second arrangement for deploying the electrical power system of FIG. 1 in a long-haul truck. As is indicated in FIG. 3, in this particular arrangement, a first module 88 that contains ultra-capacitor 62 of FIG. 1 is mounted on the frame rail of the truck 90 near the rear left side of the engine looking forward so as to be near the starter motor and thereby reduce starter lead length to a minimum. A second module 92 that contains the remaining portion of the components shown within dashed outline 10 of FIG. 1 is mounted in a compartment located immediately aft of a fuel tank 94.

As is shown in more detail in FIG. 4, the first module 88 includes a rear unit 96 and a front unit 98 that are configured for assembly with one another to form a rectangular housing for ultra-capacitor 62. Rear unit 96 includes a horizontal lower plate 100 to which ultra-capacitor 62 is secured by means of a hold-down strap 82 of the type described relative to FIG. 3. Rear unit 96 also includes side panels 102 which extend downwardly past lower plate 100 and extend upwardly to a strip-like upper panel 104 that is located above and spaced apart from the upper surface of ultra-capacitor 62. The forward edges of side panels 102 extend angularly between the front edge of strip-like upper panel 104 and the front edge of lower plate 100 to allow ease of access to ultra-capacitor 62. In addition, rear unit 96 includes a bottom panel 106 that is hinged or otherwise secured to the rear of rear unit 96 in a manner that allows bottom panel 106 to be swung downwardly. Located along the forward portion of bottom panel 106 and facing upwardly are several threaded studs 108 that are mounted in a conductive bus bar and are electrically separated from one another. Threaded studs 108 provide an arrangement for connecting battery power (both positive and ground potential) to sleeper unit hotel loads and the truck electrical system. Specifically, conventional terminals located on the ends of wires that are to be connected to one another are placed on threaded studs 108 and forced into contact with one another by tightening a nut that is engaged with the threaded studs. If desired, stud-mounted fuses may be placed between the wire terminals and the bus bar to provide appropriate current limiting. For example, type GF fuses that are manufactured by Pudenz, of Düinsen, Germany and distributed in North America by Bussman may be employed. Also located along the forward edge of bottom panel 106 is a small terminal board 110, which facilitates electrical connections for system wiring of relatively small diameter.

As can be seen in FIG. 4, front unit 98 includes a rectangular front panel 112. An upper panel 116 extends orthogonally from the upper edge of front panel 112. Side panels 114 extend downwardly, with upper panel 116 and side panels 114 being configured and dimensioned so that the enclosure formed when rear panels 96 and 98 are joined together is a closed six-sided rectangular shell.

Turning now to second module 92 of the arrangement shown in FIG. 4, four batteries 36, positioned in a side-by-side configuration are contained by an insulated enclosure that is formed by a lower enclosure unit 118 and a lid-like upper enclosure unit 120. Preferably, both lower and upper enclosure units 118 and 120 are formed of expanded foam insulating material such as polypropylene. Sheet-like heater material 122 of the previously described type is located along the walls of each battery 36, with a separate sheet of material surrounding each battery 36 or a single sheet of heater material being routed in serpentine fashion between the walls of adjacent batteries.

The insulated enclosure formed by lower and upper enclosure units 118 and 120 that contains the batteries 36 is mounted on a wood or metal pallet 124. All components of the power system other than ultra-capacitor 62 are mounted on pallet 124 adjacent the insulated enclosure. In the arrangement depicted in FIG. 4 low voltage disconnect 56 is positioned at the forward upper corner of the insulated enclosure, with a conductive bus 126 electrically connecting low voltage disconnect 56 with the positive terminals of batteries 36. Located immediately below low voltage disconnect 56 is a fuse block 128 and a threaded stud 130 which serves a portion of power distribution center 54 of FIG. 1. Positioned behind low voltage disconnect 56 and alongside the end of the insulated enclosure is a metal bracket 132 that defines an open interior space. Mounted on the upper surface of metal bracket 132 is an electrical connector 134. Low current wiring (not shown in FIG. 4) that provides current to the various hotel loads and other electrical loads requiring power when the truck engine is shut down is routed to connector 134 through the open interior of metal bracket 132. When the pallet containing batteries 36 and other components of the power system are installed in a truck, a wire harness located in the truck is interconnected with connector 134 to route power to the system control panel (26 in FIG. 1), which controls power to hotel loads, and other components such as interior lighting 24 and storage cooler 30 of FIG. 1 when the truck engine is shut down.

In this arrangement, battery power positive and ground is routed from batteries 36 to the power distribution panel (bus bar and threaded studs 108) that is located under ultra-capacitor 62. As previously noted, the conventional truck electrical system and circuits that support the truck hotel loads are connected to the positive and negative terminals of batteries 36 via the power distribution panel. In the currently preferred arrangement of FIG. 4, the shore power connector (53 in FIG. 1) is mounted to the second module 92. As described relative to the arrangement of FIG. 1, when the truck is connected to ac shore power, ac current is supplied to the ac powered truck loads (e.g., microwave 18, refrigerator 20, and television/entertainment unit 22 of FIG. 1)

and, additionally, is converted to dc for charging batteries 36. The ac connection is via connector 134 of FIG. 4, which also connects remote control and status signals associated with inverter 52, low voltage disconnect 56 and power monitor 58 (FIG. 1) to control panel 26 of FIG. 1, which is typically located at the head end of the sleeper unit bunk.

With continued reference to the arrangement depicted in FIG. 4, inverter 52 is located alongside metal bracket 132. A conductive bus 136 interconnects the negative dc input terminal of inverter 52 with the negative battery terminals of batteries 36. In the depicted arrangement, conductive bus 136 includes a first segment that extends between the negative terminals of batteries 36; a second segment that is electrically connected to the first segment and extends parallel thereto from the battery 36 most distant from inverter 52; and a third segment that extends angularly from the end of the second segment to the negative dc input terminal of inverter 52. Although not shown in FIG. 4, electrical connection is also provided for interconnection of the negative battery terminals with truck ground potential when the arrangement of FIG. 4 is installed in the truck. Also not shown in FIG. 4 are various electrical interconnections of the power system components that have been described relative to the arrangement of FIG. 1.

Located adjacent the forward face of inverter 52 is a vertically extending mounting panel 138. Positioned on mounting panel 138 are voltage regulator 46, heater relay 48 and dc-to-dc converter 66 which are electrically interconnected with one another and other components of the power system in the manner that was described relative to FIG. 1.

Figure 5:
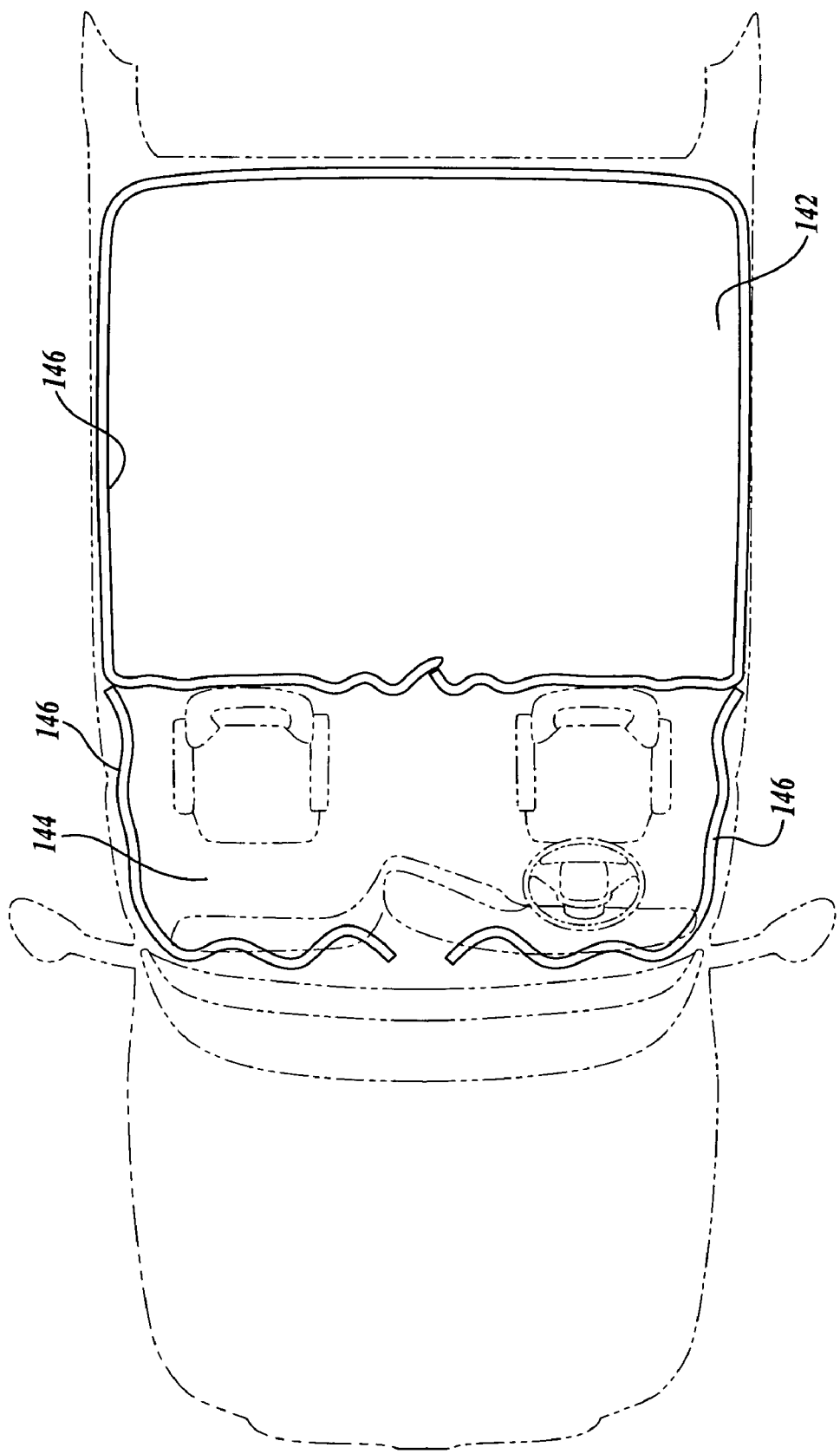
FIG. 5 is a top view of the forward portion of a long-haul truck depicting thermal insulation for isolating the sleeper unit from the forward portion of the truck cab.
Figure 6:
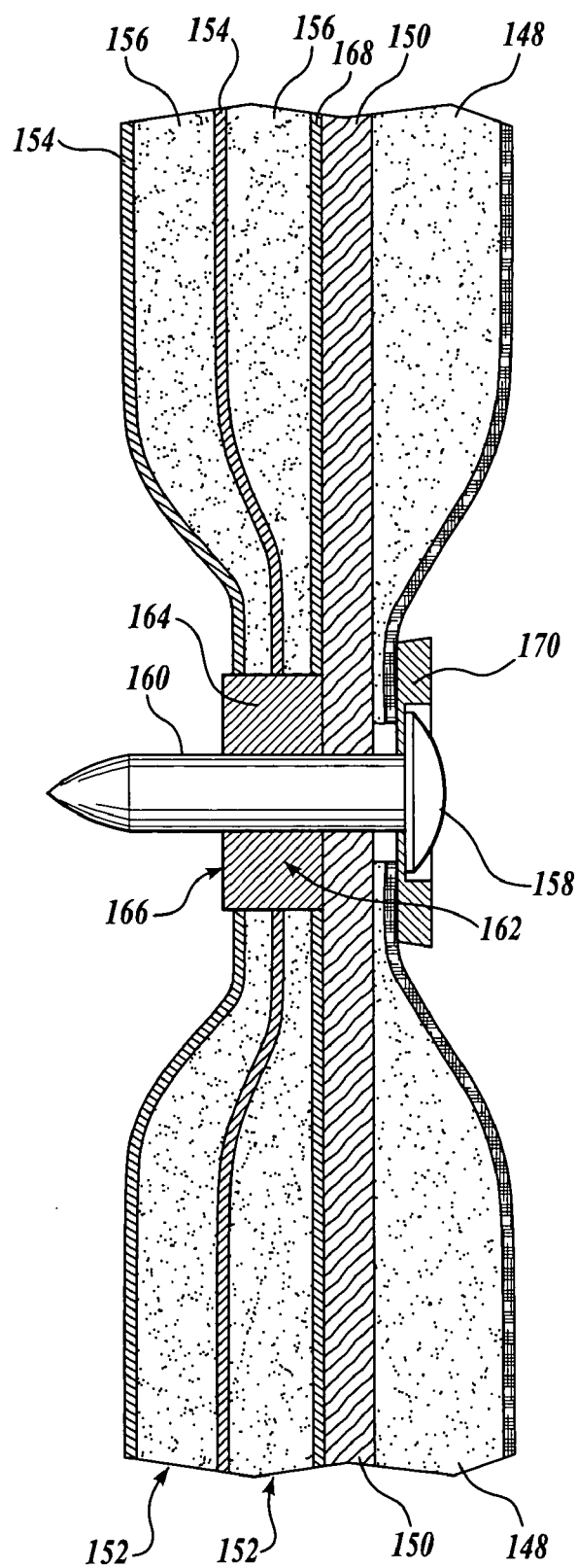
FIG. 6 depicts further details of a material that can be employed as the thermal insulation of FIG. 5, showing the use of that material to insulate the sleeper wall panels.

It will be recognized by those skilled in the art that performance of the electrical power system described relative to FIGS. 1–4 will be enhanced by thermal insulation of interior regions of the vehicle that are cooled by storage cooler 30 and heated by air heater 32 of FIG. 1. An arrangement for thermally isolating the interior of a long-haul truck that employs the previously described electrical power system is shown in FIGS. 5 and 6. As is indicated in FIG. 5, the interior region of a long-haul truck typically includes a sleeper unit 142 and a driving compartment 144. In the arrangement of FIG. 5, insulating material 146 surrounds the side and rear walls of sleeper unit 142. In addition, the insulating material 146 forms a curtain that can be used to provide a thermal barrier between sleeper unit 142 and driving compartment 144. Further, stowable sections of insulating material 146 can be placed over the side windows and windshield of driving compartment 144 when sleeper unit 142 is in use. Insulation is also preferably used in roof cab completing 100% insulation wrap of the sleeper.

FIG. 6 illustrates one type of insulating material 146 that is suitable for use in the practice of the invention and, in addition, illustrates the use of the depicted insulating material in conjunction with wall panels of the type that commonly line the walls of sleeper unit 142. In FIG. 6, the wall panels are formed by a sheet of vinyl-faced foam material 148 that is bonded or otherwise secured to a backboard 150. Insulating material 146 of FIG. 5 is located behind backboard 150 (i.e., on the face of backboard 150 that is installed adjacent the metal walls of the truck). In the arrangement shown in FIG. 6, insulating material 146 includes two layers of metallic foil-faced pliant foam 152. In the two-layer arrangement of FIG. 6, metalized faces 154 of both insulation layers 152 face toward the exterior of the truck. The metalized faces 154 are formed of metalized mylar and are separated by the foam to minimize thermal conductivity between the inner and outer walls of sleeper unit 142. An additional foil layer 168 is located on the innermost insulation layer 152 (in contact with backboard 150) to reflect heat back into the sleeper unit. It can be noted that the arrangement of FIG. 6, can employ two foam layers that have metalized foil on both foam faces in either arrangement. Foil layer 168 is thermally separated by open cell foam from the two outer reflective layers 154. For ease of fabrication or installation, foil layer 168 inner reflective layer is spot attached to the back side of backboard 150. Preferably, the foam material used in the foil-faced insulation 152 is an open cell foam, which provides both adequate thermal insulation and acoustic dampening.

With continued reference to FIG. 6, insulation layers 152 are secured to backboard 150 of the trim panel that is shown in FIG. 6 by means of a fastener 158. Fastener 158 includes a pointed shaft 160 that extends through a suitably sized opening in backboard 150. Located on the interior end of fastener 158 is a washer-like decorative button 170 that is either an integral portion of fastener 158 or is a separate component that is retained in place by the head of fastener 158. The two insulation layers 152 are joined to backboard 150 by an annular retainer 162 that is inserted in a suitably sized opening in insulation layers 152. As is indicated in FIG. 6, fastener 160 compresses insulation layers 152 to hold the insulation layers against backboard 150. A suitable adhesive applied to retainer 162 and fastener 160 bonds the fastener and retainer to the rear surface of backboard 150. When constructed in the manner shown in FIG. 6, suitable trim panels that include both the interior trim and layers of insulation can be assembled prior to installation in the truck. A variation of this attachment system uses a simple straight ¼" nylon spacer (no head) and the insulation is hot melt glued on the backboard using a grid of spaced apart spots of glue (e.g., a rectangular grid with 10 inch spacing). The insulation is punched and the spacer is hot melt glued through the hole to the backboard. Installing the insulation in either fashion does not affect production line trim installation procedure currently used by the assignee of this invention.

As previously mentioned, insulation material of the type described relative to FIG. 6 can be used to provide a curtain that separates the truck sleeper unit from the driving compartment of the truck (a "B post curtain") and, in addition, used for window and windshield covers that can be employed when the sleeper unit is in use. In such arrangements, one or more layers of metalized foil-faced insulation can be used to achieve the desired thermal characteristics. Spaced apart vertical stitching (e.g., on 4" centers) make the B post curtain easier to fold and store when it is not in use.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An electrical power system for use in a vehicle that includes an engine equipped with a starter motor and an alternator for supplying electrical current while the vehicle engine is in operation, said electrical power system being operable for supplying power to equipment that is contained in the vehicle and that requires power during periods of time during which the vehicle engine is shut down, said electrical power system comprising:
   an insulated enclosure;
   a set of one or more batteries contained within said insulated enclosure;
   an electrical heating element contained within said insulated enclosure for maintaining the temperature of said set of batteries at or near a predetermined temperature while the vehicle engine is in operation; and circuitry for sensing the temperature of said set of batteries and for selectively supplying electrical power from the alternator of the vehicle to said electrical heating element when the vehicle engine is in operation, said circuitry supplying said electrical power from the vehicle alternator when the temperature of said set of batteries is below said predetermined temperature and interrupting the supply of electrical power from the vehicle alternator when the temperature of said set of batteries reaches said predetermined temperature.

2. The electrical power system of claim 1 wherein said circuitry for sensing the temperature of said set of batteries includes a temperature sensor in contact with at least one battery terminal of said set of batteries and a switching element for receiving electrical current from the vehicle alternator, said switching element electrically connecting current from the vehicle alternator to said electrical heating element when said temperature sensor indicates battery temperature below said predetermined temperature and interrupting the current from the vehicle alternator when said temperature sensor indicates that said battery temperature is at said predetermined temperature.

3. The electrical power system of claim 2 wherein said switching element is a relay and wherein said circuitry for sensing the temperature of said set of batteries includes circuitry for receiving a signal supplied by said temperature sensor and for energizing said relay when said temperature sensor indicates battery temperature below said predetermined temperature.

4. The electrical power system of claim 3 wherein the vehicle includes a voltage regulator connected to the vehicle alternator for establishing the voltage supplied to said set of batteries when the vehicle engine is in operation and wherein said circuitry for energizing said relay is included in the vehicle voltage regulator.

5. The electrical power system of claim 2 wherein the vehicle is equipped with dc power devices that are operable when the vehicle engine is not in operation and wherein said electrical power system further comprises a low voltage disconnect unit for disconnecting said set of batteries from at least a portion of the dc power devices when the terminal voltage of said set of batteries is at a first predetermined terminal voltage.

6. The electrical power system of claim 5 wherein said low voltage disconnect unit disconnects said set of batteries from at least a portion of said dc power devices when the terminal voltage of said set of batteries remains at or below a second predetermined terminal voltage for a predetermined period of time, said second predetermined terminal voltage being greater than said first predetermined terminal voltage and being less than the terminal voltage of said second set of batteries when said set of batteries is fully charged.

7. The electrical power system of claim 5 wherein the vehicle is equipped with ac powered devices that are operable when the vehicle engine is not in operation and wherein said electrical power system further comprises an inverter unit, said inverter unit being connected for receiving dc current from said set of batteries and for supplying ac power to said ac power devices.

8. The electrical power system of claim 2 wherein said electrical heating element is a resistive sheet material that exhibits flexibility that allows said resistive sheet material to be wrapped about said set of batteries.

9. The electrical power system of claim 1 further comprising a capacitor capable of storing electrical energy sufficient for powering the vehicle starter motor through a plurality of vehicle start cycles.

10. The electrical power system of claim 9 further comprising a dc-to-dc converter connected to said capacitor and to said set of batteries, said dc-to-dc converter having a predetermined output voltage for establishing the fully charged potential of said capacitor at a predetermined target voltage.

11. The electrical power system of claim 10 wherein said predetermined target voltage of said capacitor is less than the maximum output voltage of the vehicle alternator and is greater than the voltage of said set of batteries when the batteries are in a state of discharge.

12. The electrical power system of claim 11 wherein said dc-to-dc converter is an up/down converter operable to down covert the output voltage of the vehicle alternator to said target voltage of said capacitor when the vehicle alternator output voltage exceeds said capacitor target voltage, said up/down converter being further operable to up convert the voltage supplied by said set of batteries to said capacitor target voltage when the vehicle engine is shut down and the terminal voltage of said set of batteries is less than said capacitor target voltage.

13. The electrical power system of claim 12 further comprising circuitry for monitoring the dc current being supplied to said capacitor and de-energizing said dc-to-dc converter when the current is at a level that indicates that the capacitor is at said capacitor target voltage and for energizing said dc-to-dc converter when the capacitor terminal voltage falls below said capacitor target voltage.

14. The electrical system of claim 13 wherein said circuitry for monitoring the dc current being supplied to said capacitor and de-energizing said dc-to-dc converter is included in said dc-to-dc converter.

15. The electrical power system of claim 8 further comprising a capacitor capable of storing electrical energy sufficient for powering the vehicle starter motor through a plurality of vehicle start cycles.

16. The electrical power system of claim 15 further comprising a dc-to-dc converter connected to said capacitor and to said set of batteries, said dc-to-dc converter having a predetermined output voltage for establishing the fully charged potential of said capacitor at a predetermined target voltage.

17. The electrical power system of claim 16 wherein said predetermined target voltage of said capacitor is less than the maximum output voltage of the vehicle alternator and is greater than the voltage of said set of batteries when the batteries are in a state of discharge.

18. The electrical power system of claim 17 wherein said dc-to-dc converter is an up/down converter operable to down covert the output voltage of the vehicle alternator to said target voltage of said capacitor when the vehicle alternator output voltage exceeds said capacitor target voltage, said up/down converter being further operable to up convert the voltage supplied by said set of batteries to said capacitor target voltage when the vehicle engine is shut down and the terminal voltage of said set of batteries is less than said capacitor target voltage.

19. The electrical power system of claim 18 further comprising circuitry for monitoring the dc current being supplied to said capacitor and de-energizing the dc-to-dc converter when the current is at a level that indicates that the capacitor is at said capacitor target voltage and for energizing said dc-to-dc converter when the capacitor terminal voltage falls below said capacitor target voltage.

20. In a long-haul truck of the type that includes a sleeper unit and an engine having a starter motor and an alternator, the improvement comprising:
an electrical power system for supplying power when the engine of said long-haul truck is shut down, said electrical power system including a plurality of batteries connected in parallel with one another, said batteries being contained within an insulated enclosure and being thermally charged to a predetermined temperature when said long-haul truck is in operation; and
a cooling unit for supplying cooling air to said sleeper unit when said engine is shut down, said cooling unit including a phase change media that is thermally charged to a low temperature when said long-haul truck is in operation, said cooling unit further including a blower motor powered by said electrical power system when said cooling air is being supplied to said sleeper unit.

21. The long-haul truck of claim 20 wherein the improvement further comprises a capacitor electrically connected to the truck starter motor, said capacitor being capable of storing electrical energy sufficient for powering the starter motor through a plurality of engine start cycles without the starter motor being supplied electrical current from said plurality of batteries.

22. The improvement of claim 20 wherein said electrical power system includes a heating element for thermally charging said plurality of batteries to said predetermined temperature, said heating element being a resistive sheet material at least partially encompassing said plurality of batteries, said resistive sheet material being connected for receiving current supplied by the alternator of the long-haul truck when the long-haul truck is in operation.

23. The improvement of claim 22 wherein said electrical power system further comprises circuitry for sensing the temperature of said plurality of batteries, said circuitry including a temperature sensor positioned to sense the temperature of at least one battery of said plurality of batteries and a switching element for receiving current from the vehicle alternator, the switching element electrically connecting current from the vehicle alternator to said heating element when said temperature sensor indicates a battery temperature below said predetermined temperature and for interrupting the current from the vehicle alternator when said temperature sensor indicates that said battery temperature is at said predetermined temperature.

24. The improvement of claim 23 wherein said electrical power system further comprises an over temperature switch positioned to sense the temperature of said heating element, said over temperature switch interrupting current flow to said heating element in the event the temperature of said heating element exceeds a predetermined value.

25. The improvement of claim 21 wherein said electrical power system further comprises a dc-to-dc converter connected to said capacitor and to said plurality of batteries, said dc-to-dc converter having a predetermined output voltage for establishing the fully charged potential of said capacitor at a predetermined target voltage.

26. The improvement of claim 25 wherein said predetermined target voltage of said capacitor is less than the maximum output voltage of the alternator of the long-haul truck and is greater than the voltage of said plurality of batteries when the batteries are in a state of discharge.

27. The improvement of claim 26 wherein said dc-to-dc converter is an up/down converter operable to down convert the output voltage of the long-haul truck alternator to said target voltage of said capacitor when the long-haul truck alternator output voltage exceeds said capacitor target voltage, said up/down converter being further operable to up convert the voltage supplied by said set of batteries to said capacitor target voltage when the engine of the long-haul truck is shut down and the terminal voltage of said plurality of batteries is less than said capacitor target voltage.

28. The long-haul truck of claim 23 wherein the improvement further comprises a capacitor electrically connected to the truck starter motor, said capacitor being capable of storing electrical energy sufficient for powering the starter motor through a plurality of engine start cycles without the starter motor being supplied electrical current from said plurality of batteries.

29. The improvement of claim 28 wherein said electrical power system further comprises a dc-to-dc converter connected to said capacitor and to said plurality of batteries, said dc-to-dc converter having a predetermined output voltage for establishing the fully charged potential of said capacitor at a predetermined target voltage.

30. The improvement of claim 29 wherein said predetermined target voltage of said capacitor is less than the maximum output voltage of the alternator of the long-haul truck and is greater than the voltage of said plurality of batteries when the batteries are in a state of discharge.

31. The improvement of claim 30 wherein said dc-to-dc converter is an up/down converter operable to down convert the output voltage of the long-haul truck alternator to said target voltage of said capacitor when the long-haul truck alternator output voltage exceeds said capacitor target voltage, said up/down converter being further operable to up convert the voltage supplied by said set of batteries to said capacitor target voltage when the engine of the long-haul truck is shut down and the terminal voltage of said plurality of batteries is less than said capacitor target voltage.

* * * * *